United States Patent [19] [11] 4,020,729

Guillemette [45] May 3, 1977

[54] MUSICAL INSTRUMENT WITH PRERECORDED TONES ON TAPE

[76] Inventor: Roland J. Guillemette, 762 High St., North Bay, Ontario, Canada

[22] Filed: Feb. 18, 1976

[21] Appl. No.: 658,891

[52] U.S. Cl. .................................. 84/1.28; 84/1.09; 84/1.26; 84/1.27

[51] Int. Cl.² ...................... G01H 3/04; G10H 1/02

[58] Field of Search ................. 84/1.09, 1.12, 1.13, 84/1.18, 1.21, 1.26, 1.27, 1.28

[56] References Cited

UNITED STATES PATENTS

| | | | |
|---|---|---|---|
| 3,248,470 | 4/1966 | Markowitz | 84/1.26 |
| 3,420,940 | 1/1969 | Glass et al. | 84/1.18 X |
| 3,553,340 | 1/1971 | McLoughlin | 84/1.26 |
| 3,657,459 | 4/1972 | Peterson | 84/1.09 |

*Primary Examiner*—E. S. Jackmon
*Attorney, Agent, or Firm*—Erwin S. Teltscher

[57] ABSTRACT

A musical instrument includes a multiplicity of circular endless magnetizable tapes with a plurality of different tracks, a multiplicity of pick-up heads for each of the tracks and a multiplicity of variable-gain amplifiers connected to the tracks, respectively. Keys having respective contact means for energizing each of the amplifiers, cause a multiplicity of magnetic elements to generate respective voltages in coils, each voltage being proportional to the force with which an individual key has been depressed. This voltage sets the gain of a respective amplifier, so that the loudness of a recorded tone heard is proportional to the actuating force of a key.

5 Claims, 6 Drawing Figures

FIG. 1
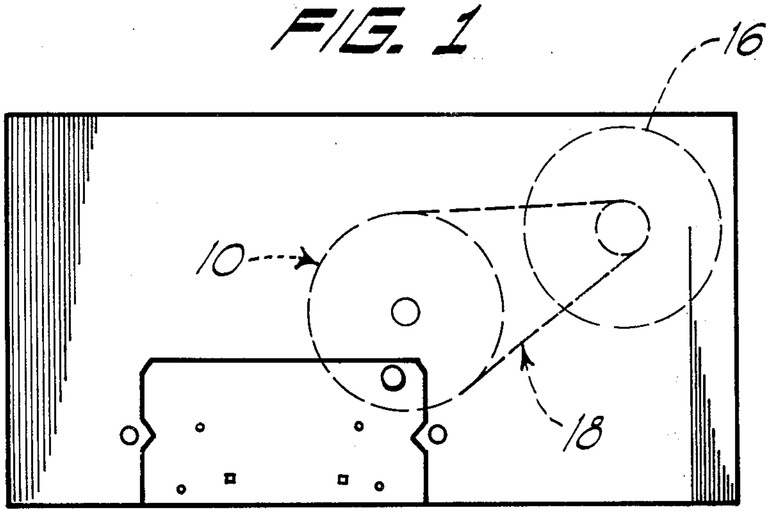
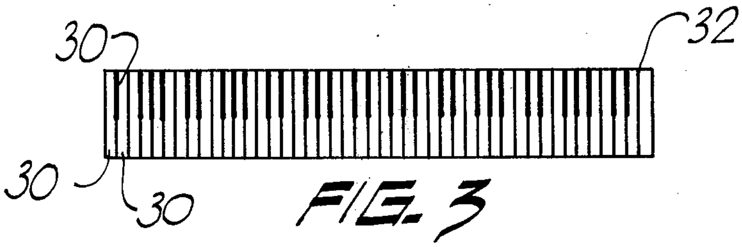
FIG. 3
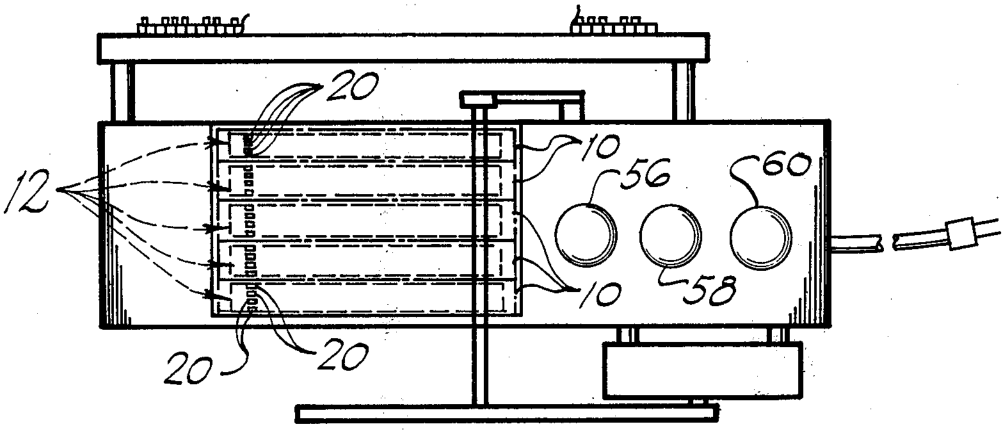
FIG. 2
FIG. 4
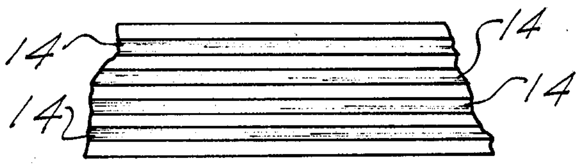

FIG. 5
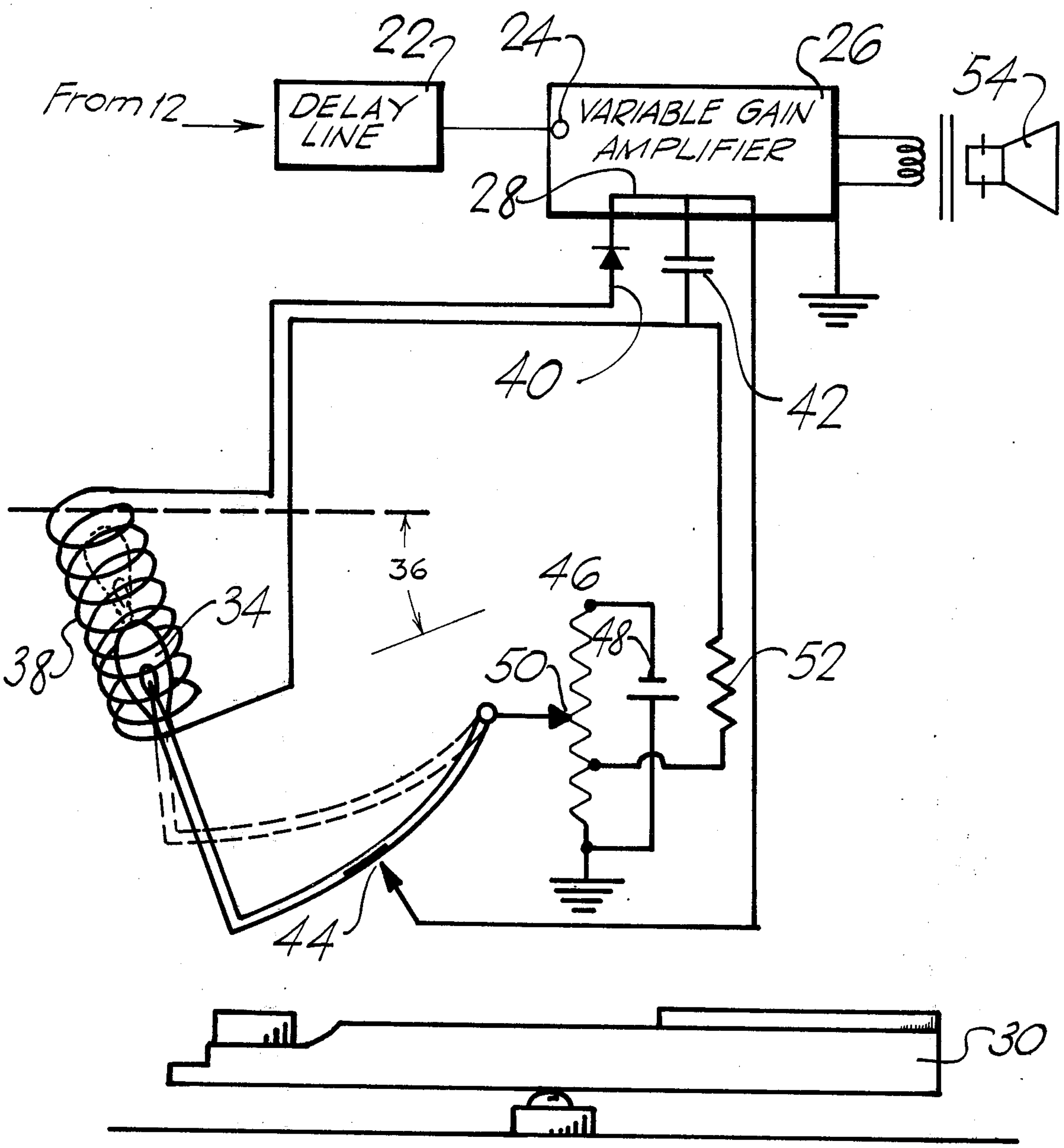
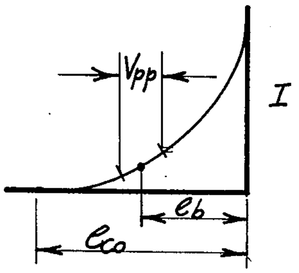
FIG. 6

MUSICAL INSTRUMENT WITH PRERECORDED TONES ON TAPE

BACKGROUND OF THE INVENTION

1. Field of the Invention

The invention relates to a musical instrument with prerecorded tones on tapes.

2. Description of the Prior Art

Electronic musical instruments having pre-recorded tapes for sound generation are known in which the loudness of the reproduced tones is varied by a single foot-pedal. This means of varying the loudness of a tone leaves much to be desired, though. It is not in accordance with the means of varying the loudness of a tone on standard keyboard instruments such as pianos or organs, and thus lacks the expression which can be given to music if the loudness of each note is separately variable as a function of the force with which a particular key is depressed or struck.

SUMMARY OF THE INVENTION

It is therefore an object of the present invention to devise an electrical musical instrument with prerecorded tones on tape, where the loudness of each note is variable as a function of the force with which each key of a keyboard is struck, or depressed.

I attain the above object by providing a multiplicity of elongated circular endless magnetizable tapes. Each of the tapes has a plurality of different tracks, a different note being recordable on each of the tracks. Each of the tapes is of sufficient length to accomodate the tone of each note one each of the tracks, respectively. Additionally, a multiplicity of non-magnetizable supports are mounted coaxially for support of the tapes, respectively, and drive means are provided for rotating the supports and tapes. I further provide a multiplicity of magnetic pick-up heads for each track, the heads being in sufficient proximity to the tracks, respectively, to be energized thereby. The magnetic pick-ups feed a multiplicity of amplifiers, respectively; each amplifier has a gain in dependence on a gain-setting voltage and an input connected to a corresponding pick up head, and is separately energizable.

A multiplicity of keys are provided for energizing each of the amplifiers, respectively, and each key is associated with a contact means for energizing a corresponding amplifier upon depression of the key. A multiplicity of magnetic elements are pivotable by each of the keys, upon depression of a respective key from a first position to a second position, the pivoting of one of the respective elements actuating a corresponding contact means. A multiplicity of coils surround each of the elements, respectively, for generating the gain-setting voltage in dependence on the velocity of motion of a corresponding element movable in a respective coil. Each of the coils is connected to a respective amplifier, so that, upon one of the keys being depressed, a corresponding magnetic element generates the gain-setting voltage in a corresponding coil, thereby presetting the gain in a corresponding amplifier.

It is further advantageous if a plurality of delay lines is interconnected between the magnetic heads and the inputs to the amplifiers, respectively; a box-car circuit is interconnected between each of the coils and each of the amplifiers, and rectifying means are connected to each coil for suppressing a fly-back voltage generated by each of the magnetic elements upon the respective return thereof to the first position. The box-car circuit is preferably a capacitor, the rectifying means a diode, and each of the coils is preferably connected in a loop with the capacitor and the diode.

BRIEF DESCRIPTION OF THE DRAWING

My invention will be better understood with reference to the accompanying drawing in which:

FIG. 1 shows a bottom plan view of the musical instrument, according to my invention;

FIG. 2 shows an elevational view of the musical instrument;

FIG. 3 shows a top plan view of the keyboard of the musical instrument;

FIG. 4 shows an enlarged version of a section of the tape;

FIG. 5 shows a block-circuit diagram showing the interconnection between a coil, a box-car circuit, a delay line and a variable amplifier; and FIG. 6 shows the gain characteristics of the variable-gain amplifier.

DESCRIPTION OF THE PREFERRED EMBODIMENT

Referring now to the drawing, a multiplicity of non-magnetizable circular supports 10 mounted coaxially carry a multiplicity of elongated circular endless magnetizable tapes 12; for example the drawing shows 5 supports 10 carrying 5 tapes 12. Each of the tapes 12 has a plurality of different tracks 14, nomally up to eight tracks 14 being available on each of the tapes 14; four tracks 14 are shown for simplicity's sake.

Drive means, e.g. an electric motor 16, drive the supports 10 and the tapes mounted thereon, respectively, for example by means of belt drive 18. A magnetic pick-up head 20 is provided for each track 14, the pick-up head being in sufficient proximity to each track, respectively, to be energized thereby.

Each pick-up head 20 is connected to the input of a delay line 22, and the output of each delay line 22 is connected to an input 24 of a variable-gain amplifier 26. The gain of each amplifier 26 is controllable by a gain-setting voltage received on a second input 28 of the amplifier 26. By biasing the second input 28 of the amplifier 26 sufficiently negative, the gain of the amplifier 26 can be reduced to zero, i.e., the amplifier can be virtually de-energized by such a negative biasing voltage, and conversely, energized by applying a voltage to the input 28 of a sufficient magnitude so as to energize the amplifier 26.

A multiplicity of keys 30 are assembled on a keyboard 32. The keyboard 32 is constructed in a fashion substantially similar to that of a keyboard of a grand piano, as described, for example, on pp. 448 to 449 of "The way things work" Vol. 2, published by Simon and Schuster, New York. In lieu of a conventional hammer, a magnetic element 34 is used, however, which, like a conventional keyboard hammer, is pivotable through an arc 36 upon a depression of one of the keys 30 from a first position to a second position shown dotted in FIG. 5. Each of the elements 34 is surrounded by a coil 38. When the element 34 swings through the arc 36, a voltage is generated across the terminals of the coil 38, its magnitude and polarity being dependent on the speed and direction of the motion of the element 34, respectively. The output of the coil 38 is connected to the input 28 of the amplifier 26. Additionally, a capacitor 42 is shunted between the input 28 of the amplifier 26 and ground, the output of the coil 38, a diode 40, and the capacitor 42 being connected in a loop.

When the element 34 is in the first position, contact means are closed, and the input 28 is additionally connected through the contact means 44 to the negative terminal 46 of a d.c. voltage source 48 through a variable resistor 50. The negative voltage on the input 28 can therefore be adjusted by the variable resistor 50 to a cut off bias of the amplifier 26, so that the latter is cut off and does not amplify any signal it receives on its input 24.

The small-signal gain characteristics of the amplifier 26 are shown in FIG. 6. When a small signal having a peak-to-peak excursion $V_{pp}$ is biased at a negative voltage $e_b$, the amplifier 26 will exhibit a nominal gain. The gain of the amplifier 26 increases, as the biasing voltage $e_b$ is reduced from a relatively large negative voltage to a smaller negative voltage, and is reduced to zero when the negative biasing voltage $e_b$ is equal or greater than the cut off voltage $e_{co}$. In the first position of the element 24 the amplifier 26 is biased beyond cutoff, by the negative voltage appearing on variable resistor 50; as soon as the element 34 starts its swing to a second position, the contact means 44 is opened and the negative biasing voltage is reduced to a value permitting the amplifier 26 to operate at a nominal gain.

When the element 34, as a result of actuation by a key 30, swings upward, a positive voltage is developed across the coil 38, the diode 40 then acting as a virtual short-circuit. The capacitor 42 then holds this positive voltage, thus acting as a boxcar circuit, so that the gain of the amplifier 26 is momentarily increased in dependence of the upward velocity of the element 34, which is in turn a function of the striking force employed to actuate the key 30 struck. Upon release of the key 30 the element 34 falls back, and then develops a negative-going or fly-back voltage across the coil 38. As a result of the subsequent reverse-bias occurring on the diode 40, the latter then acts, though, as a virtual open-circuit, and the negative-going voltage momentarily developed across the coil 38 has no effect on the amplification of the amplifier 26. When the element 34 finally reaches the first position, contact means 44 closes, and as a result of the relatively low resistance path from contact means 44 to ground, the capacitor 42 discharges rapidly, so that the amplifier 26 is again cut off. A resistor 52 interconnected between a tap on the variable resistor 50 and the capacitor 40 has a resistance considerably higher than that occurring between the variable contact of the potentiometer 50 and ground, so that the capacitor 42 substantially maintains its charge when charged by a voltage generated by the coil 38 during the upstroke of the element 34.

The output of all amplifiers 26 is fed to a common speaker 54, so that the notes recorded on one of the tracks 14, picked up by one of the pick-up heads 20, and amplified by one of the amplifiers 26 can be heard over the speaker 54.

Controls 56, 58 and 60 serve respectively to adjust the speed of the motor 16, the volume range of the speaker 54 and the tone-control, or frequency cut off thereof.

Although the invention has been described with respect to a preferred form thereof, it is to be understood that it is not to be so limited since changes can be made therein which are within the full intended scope of this invention as defined by the appended claims.

What is claimed is:

1. A musical instrument comprising:

a multiplicity of elongated circular endless magnetizable tapes, each of said tapes having a plurality of different tracks, a different note being recordable magnetically on each of said tracks, each of said tapes being of sufficient length to accomodate the tone of each of said notes on each of said tracks, respectively;

a multiplicity of non-magnetizable supports mounted coaxially for supporting said tapes, respectively;

drive means for rotating said supports and said tapes;

a multiplicity of magnetic pick-up heads for each of said tracks, said heads being in sufficient proximity to said tracks, respectively, to be energized thereby;

a multiplicity of amplifiers having a gain in dependence on a gain-setting voltage, said amplifiers having inputs connected to said magnetic pick-up heads, each of said amplifiers being separately energizable;

a multiplicity of keys, each of said keys having contact means for energizing each of said amplifiers, respectively;

a multiplicity of magnetic elements pivotable by each of said keys, respectively, upon depression of one of said keys from a first position to a second position at a velocity of motion, the pivoting of one of said elements actuating one of said contact means, respectively; and a multiplicity of coil means surrounding each of said elements, respectively, for generating said gain-setting voltage in dependence on said velocity of motion of one of said elements movable in one of said coil means, each of said coil means being connected to said amplifiers, respectively, whereby, upon one of said keys being depressed, a corresponding one of said magnetic elements generates said gain-setting voltage in a corresponding one of said coil means, thereby presetting the gain in a corresponding one of said amplifiers.

2. A musical instrument according to claim 1 further comprising a plurality of delay lines interconnected between said magnetic heads and the inputs to said amplifiers, respectively.

3. A musical instrument according to claim 1 further comprising a box-car circuit interconnected between each of said coil means and each of said amplifiers, respectively.

4. A musical instrument according to claim 3 further comprising a plurality of rectifying means connected to said coils, respectively, for suppressing a fly-back voltage generated by each of said magnetic elements upon the respective return thereof to said first position.

5. A musical instrument according to claim 4 wherein said box-car circuit is a capacitor, and said rectifying means is a diode, each of said coil means being connected in a loop with said capacitor and said diode, respectively.

* * * * *